United States Patent [19]
Ballinger et al.

[11] 3,774,226
[45] Nov. 20, 1973

[54] TRANSVERSE RECORDER

[75] Inventors: Dale O. Ballinger, Denver; Norman L. Stauffer, Englewood, both of Colo.

[73] Assignee: Honeywell Inc., Minneapolis, Minn.

[22] Filed: Dec. 9, 1971

[21] Appl. No.: 206,293

[52] U.S. Cl. .............................. 346/35, 340/324 A
[51] Int. Cl. ............................................ G01d 9/02
[58] Field of Search .................... 346/35; 340/324 A

[56] References Cited
UNITED STATES PATENTS

| | | | |
|---|---|---|---|
| 3,085,132 | 4/1963 | Innes | 178/30 |
| 3,087,420 | 4/1963 | Brehm | 101/93 |
| 3,394,383 | 7/1968 | Lloyd | 346/35 X |
| 3,409,904 | 11/1968 | Maiershofer | 346/101 |
| 3,611,411 | 10/1971 | Moshier | 346/35 |
| 3,686,662 | 8/1972 | Blixt et al. | 340/324 A |

*Primary Examiner*—Joseph W. Hartary
*Attorney*—Arthur H. Swanson et al.

[57] ABSTRACT

A recorder using an analog-to-digital converter for converting an input signal into a succession of digital words. The digital words are stored in groups with each group having a number of words corresponding to the number of recording elements arranged along a recording line. Each digital word in a group is compared with a digital signal representative of the position of a recording medium. Upon the detection of an equality between the compared signals, an energizing signal is applied to a corresponding one of the recording elements which energized state is maintained until the loss of an equality between the compared signals corresponding to a previously energized recording element. The recording lines are located transverse to the motion of the recording medium with a plurality of recording lines forming a recording frame for recording a predetermined portion of a time axis of the input signal.

10 Claims, 5 Drawing Figures

INVENTORS
DALE O. BALLINGER
NORMAN L. STAUFFER

ATTORNEY

TRANSVERSE RECORDER

An object of the present invention is to provide an improved recorder for recording information transversely to the direction of motion of a recording medium.

Another object of the present invention is to provide an improved recorder for recording continuous analog information by digitally programmed fixed recording elements.

A further object of the present invention is to provide an improved recorder for recording information on a recording medium transversely to the direction of motion of the recording medium using digitally programmed discrete recording elements to produce a recorded trace having overlapping incremental recording marks produced by the recording elements.

SUMMARY OF THE INVENTION

In accomplishing these and other objects, there has been provided, in accordance with the present invention, a recording apparatus including an analog to digital converter for converting input analog information into a digitally coded format of a plurality of digital words. A storage register is used to store the digital words from the analog to digital coverter corresponding to a recording line and to apply the stored digital words to a comparing means for comparing each stored digital word with a digital word representing a recording position of a recording medium. An energizing means energizes one of a plurality of recording elements arranged along a recording line and equal in number to the number of stored digital words upon detection of an equality by the comparing means between corresponding ones of the compared digital words. The energizing means de-energizes previously energized ones of said plurality of recording elements upon the loss of an equality between the corresponding compared digital words.

BRIEF DESCRIPTION OF THE DRAWINGS

A better understanding of the present invention may be had when the following detailed description is read in connection with the accompanying drawings, in which.

DETAILED DESCRIPTION

Figure 1:
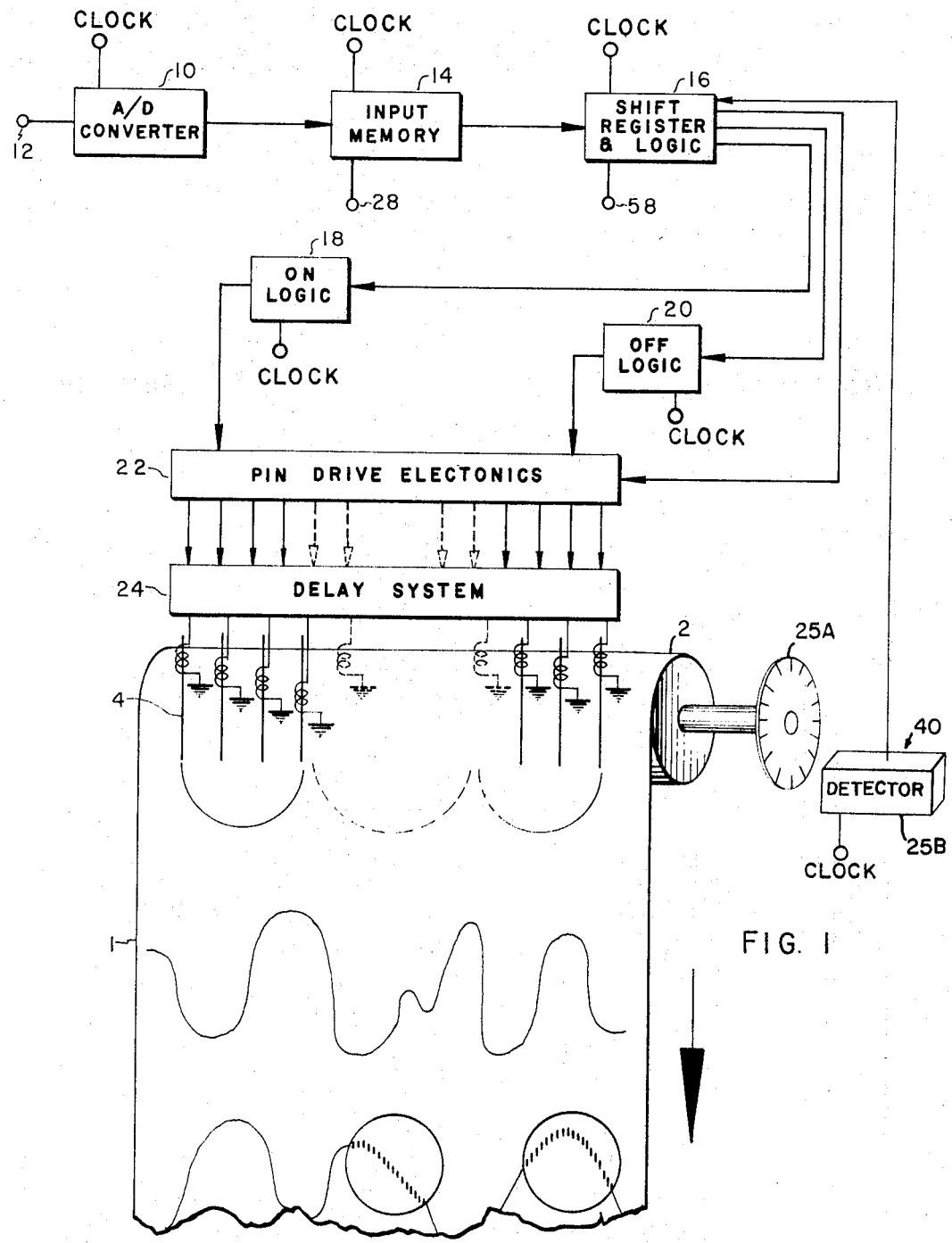
FIG. 1 is a block diagram of a recording apparatus embodying the present invention.

Referring to FIG. 1 in more detail, there is shown a transverse recorder embodying the present invention for recording on a recording medium 1. The recording medium 1 is driven by any suitable drive means (not shown) from a supply roll 2. The recording medium may be a recording medium as shown in a copending application of Dale O. Ballinger, Ser. No. 861,019, now U.S. Pat. No. 3,683,382, wherein the reocrding medium is a transparent web member having a suspension therein of force field responsive, highly reflective and flake-like particles. These particles are selectively orientable between a first and a second position whereby a recording trace may be produced on the recording medium. Specifically, the particles are pre-oriented in a first position to provide a uniform surface on the recording medium, and the recording elements are arranged to reorient the particles into a second position to provide a contrasting trace with respect to the aforesaid uniform surface.

A plurality of recording elements 4 are arranged across the recording medium 1 to define a transverse recording line. The recording elements 4 are shown in FIG. 1, for purposes of illustration, as magnetic recording pins surrounded by a solenoid winding whereby a magnetic field is directed by the pins from the solenoid winding to the recording medium 1 to reorient the aforesaid particles. The recording elements 4 are each selectively energized by a recording system illustrated in block diagram form in FIG. 1. This recording system includes an analog to digital converter 10, hereinafter referred to as A/D converter 10, arranged to convert analog input signals applied to an input terminal 12 into digitally encoded signals. These digitally encoded signals are temporarily stored in an input memory 14 and are, subsequently, transferred to a shift register and logic circuit 16. The shift register and logic circuit 16 is arranged to actuate either an "on" logic circuit 18 or an "off" logic circuit 20 to energize and deenergize the recording elements 4, respectively. The "on" logic 18 and "off" logic 20 are connected to pin drive circuits 22 to provide energizing signals for the recording elements 4. A signal delay system 24 may be provided between the pin drive circuit 22 and the recording elements 4 to insure that the recording elements 4 will record on a common transverse recording line, i.e., the delay system 24 is arranged to compensate for any operational differences among the recording elements 4.

In an exemplary system, 512 of the recording elements 4 are positioned along a transverse recording line with a set of 128 recording lines forming a transverse a recording frame for a complete waveshape recording across the recording medium 1. Thus, the A/D converter 10 converts the input analog signal into 512 digitally encoded samples. These 512 digital words are used to control the "on" and "off" logic circuits 18 and 20 for each of the 128 recording lines to produce a complete frame of transverse recording. During the time that one frame is being recorded, 512 samples of the input analog signal are being prepared by the A/D converter 10 and stored in the input memory 14 to await a transfer into the shift register and logic 16 for the next transverse recording frame. A clock means (not shown) is connected to the A/D converter 10, the input memory 14, the shift register and logic 16, and the "on" and "off" logic 18 and 20 to synchronize the operation thereof while a recording medium position signal derived from any suitable means, e.g., a code wheel 25A attached to the roller 2 and a detector 25B forming a recording medum position detector 40, as described hereinafter, is applied to the shift register and logic 16 to define the 128 transverse recording lines in each recording frame.

Figure 2:
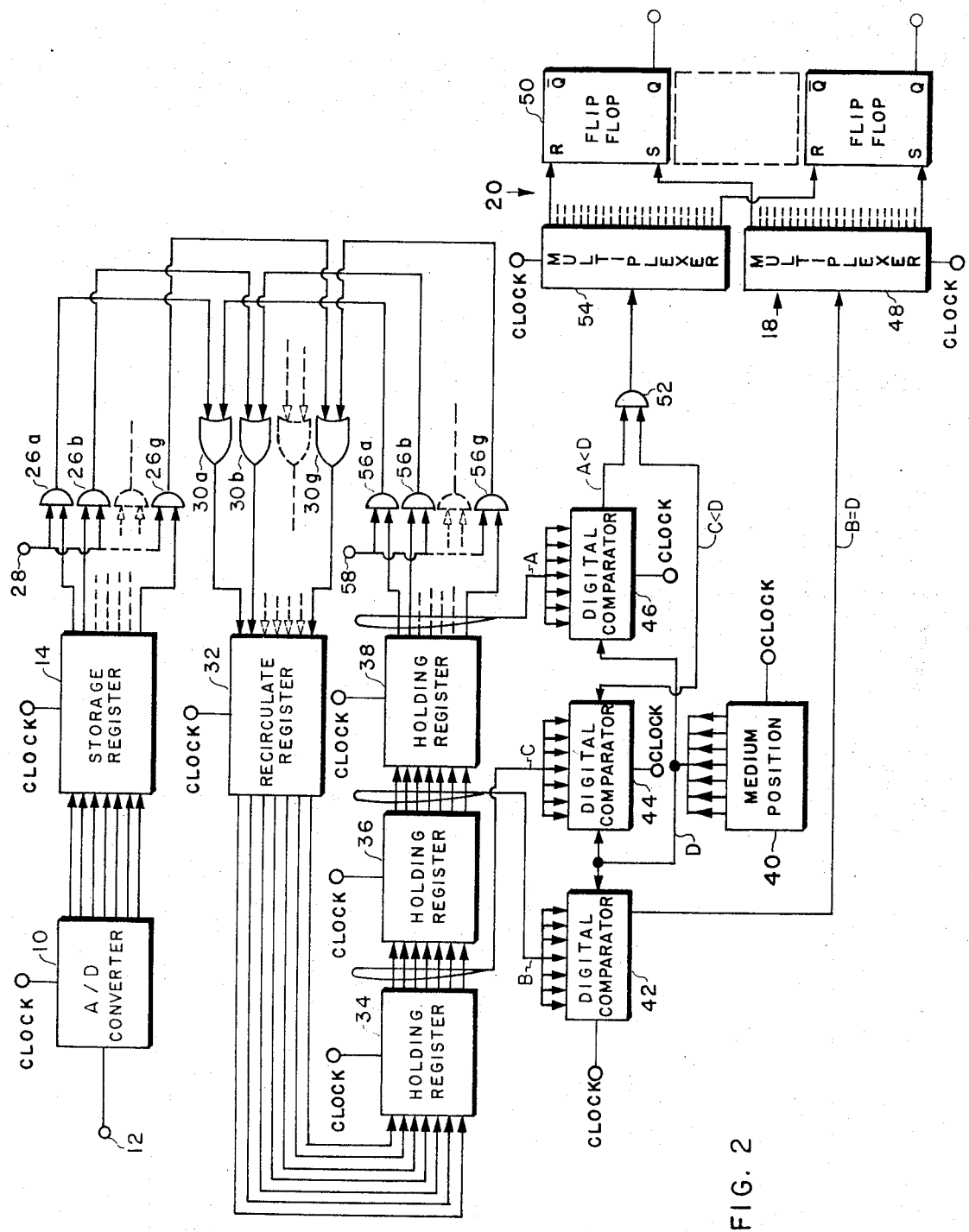
FIG. 2 is a detailed block diagram of a portion of the recording system shown in FIG. 1.

In FIG. 2, there is shown a detailed block diagram of a novel logic system used to operate the recording elements 4 shown in FIG. 1. Similar reference numbers have been used in FIG. 2 to designate the elements previously discussed herein with respect to FIG. 1. Thus, the input terminal 12 is connected to an A/D converter 10 which is arranged to convert the input analog signal into a succession of binary-coded digital signals. These digital signals are applied to the storage register 14 for temporary storage therein. The storage register 14 is arranged to store a group of seven bit words corresponding in number to the number of recording elements located along a transverse recording line, e.g., 512 seven bit words. The binary bits of each of the seven bit words stored in the storage register 14 are applied in parallel to a group of seven AND gates 26A to 26G. These AND gates are all concurrently enables by a clock signal applied to a synchronizing input terminal 28 connected to one input of each of the AND gates 26A to 26G. The outputs of the AND gates are applied to respective ones of seven OR gates 30A to 30G. The output signals from the OR gates 30A to 30G are applied in parallel to a recirculating shift register 32 capable of storing and shifting the same number of digital words as the storage register 14, i.e., 512 seven bit digital words. The digital words stored in the recirculate register 32 are sequentially applied to three serially connected holding registers 34, 36, and 38, each capable of storing one digital word. Thus, three serially related digital words are concurrently stored in the register 34, 36, and 38. In other words, the digital words stored in the holding registers 34, 36, and 38 are automatically shifted along the series of holding registers 34, 36 and 38 to succesively store a new digital word in a first one of the registers 34, 36 and 38 while a prior digital word is removed from a third one of the registers 34, 36 and 38.

The position of the recording medium 1 is converted at periodic intervals by any suitable means as discussed above with respect to FIG. 1, into a seven bit digital code which is stored in a medum position register 40. Three digital comparators 42, 44, and 46 are arranged to compare the output signal of the medium position register 40 with the output signals from a corresponding one of the holding registers 34, 36, and 38. Thus, a first digital comparator 42 is arranged to compare the output signal from the medium position register 40 with the output signal from the second holding register 36. Concurrently, a second digital comparator 44 compares the output signal of the medium position register 40 with the output signal of the first holding register 34, and a third digital comparator 46 compares the output signal of the medium position register with the third holding register 38. The output signal from the first digital comparator 42, which is identified as an equality of its input signals, i.e., B = D, is applied to the "on" logic circuit 18. Specifically, this output signal is applied to an input of a first multiplexer 48. The input signal to the first multiplexer 48 is sequentially applied under the control of a clock signal to each of the "set" terminals of a plurality of flip-flops 50 corresponding in number to the number of transverse recording elements 4, e.g., 512.

The output signal from the second digital comparator 44 representative of a predetermined inequality of its input signals, i.e., C < D, and the output signal from the third digital comparator 46 representative of a predetermined inequality of its input signals, i.e., A < D, are concurrently applied to an AND gate 52. The output signal from the AND gate 52 is applied to an input of a second multiplexer 54 in the "off" logic 20. The multiplexed output signal from the second multiplexer 54 is, in turn, sequentially applied to each of the "reset" terminals of the plurality of flip-flops 50. The output signal from the thrd holding register 38 is also applied to a first input of respective ones of a plurality of AND gates 56A to 56G. These AND gates 56A to 56G are enabled by a synchronizing input terminal 58 connected to a second input on all of the AND gates 56A to 56G. The output signals from the AND gates 56A to 56G are applied to respective ones of the OR gates 30A to 30G for recirculation in the recirculate register 32. As previously discussed, the 512 digital words are circulated 128 times during one frame of recording. The output signals from the logical 1 side of the flip-flop 50, shown as Q outputs are applied to the pin drive electronics 22 for energizing respective ones of the recording elements 4. Thus, the application of an input signal to the "set" terminal of any one of the flip-flops 50 from the first multiplexer 48 is effective to produce an output level from the Q output terminal of that flip-flop to turn on a corresponding recording element 4 and, conversely, the application of an input signal to the "reset" terminal of any one of the flip-flops 50 is effective to remove the output signal from the Q output terminal to deenergize a corresponding one of the recording elements 4. Accordingly, the multiplexer 48 and the associated "set" input terminals of the flip-flops 50 are used in the "on" logic 18 to produce a recording mark on the recording medium 1 while the multiplexer 54 and the associated "reset" input terminals of the flip-flops 50 are used in the "off" logic circuit 20 for terminating the recording of a mark on the recording medium 1. In other words, a recorded mark is produced by a recording element 4 on the recording medium 1 when a corresponding one of the flip-flops 50 is set by an input signal applied to its "set" input terminal and the recorded mark is continued until an input signal is applied to the "reset" input terminal of that flip-flop.

In summary, the analog input signal applied to the input terminal 1 is sampled and converted by the A to D converter 10 to digital form and stored in the storage register 14 until the storage register 14 is filled by the storage therein of 512 seven bit digital words. These digital words are then transferred to the recirculate register 32 through the clock controlled AND gates 26A to 26G and the OR gates 30A to 30G. Since in a typical configuration there are 128 recording rows across the recording medium 1 forming a frame of recorded data, i.e., the recording of a complete waveshape across the recording medium 1, and 512 recording elements 4 are positioned across the recording medium 1 forming a recording row, the following requirements are applicable to the number of clock pulses used in the logic circuit:

A suitable clock means (not shown) is used to supply synchronizing pulses to the various blocks of the recording system shown in FIGS. 1 and 2. The A to D converter 10 is supplied with seven clock pulses per conversion of an analog input signal to a seven bit digital word for each of the 512 words needed to actuate the recording elements 4. Since a frame of recording across the recording medium 1 will use all of the 512 recording elements 4, the analog-to-digital converter 10 is supplied with a total 3,584 pulses per frame. The storage register 14 is arranged to store the 512 digital words per frame from the analog-to-digital converter 10 and, hence, is provided with 512 clock pulses from the clock means to store the digitized values for each frame presented by the analog-to-digital converter 10. In addition, a burst of 512 clock pulses is used to transfer the previously stored digital data from the storage register 14 to the recirculate register 32 by reading out digital words from the storage register 14 and concurrently actuating the AND gates 26A to 26G. The total number of clock pulses applied to the storage register 14 from the clock means, accordingly, is 1,024 clock pulses per frame of recording.

The recirculate register 32 is supplied with a burst of 512 clock pulses to transfer the digital word frame information presented through the AND gates 26A to 26G into the recirculate register 32. The digital words stored in the recirulate register 32 are recirculated 128 times, i.e., using 512 digital words per recirculation, with each recirculation being accomplished during the time that a corresponding one of the 128 transverse recording lines forming a recording frame on the recording medium 1 passes beneath the recording elements 4, i.e., transverses the recording face width. Thus, the recirculate register 32 is provided with 66,048 clock pulses per frame of recording. The holding register 34, 36 and 38 are provided with the number of clock pulses required for the 128 recirculations of the 512 digital words plus a clear pulse to prepare the registers 34, 36 and 38 for the next frame recording for a total of 65,537 clock pulses per recording frame. The digital comparators 42, 44 and 46 receive one clock pulse for each comparison operation which operation occurs 512 times per recirculation with 128 recirculation being provided per frame of recording for a total of 65,536 clock pulses per frame from the clock means. The recording medium position detector 40 is provided with one pulse per recirculation to synchronize recording medium motion with the operation of the recording system so that the recording medium will have traveled the recording face width of the recording elements 4 for each recirculation for a total of 128 pulses per frame. Finally, the multiplexers 48 and 54 receive one pulse for each comparison operation by the comparators 42, 44 and 46 which is effective to turn on or off a corresponding one of the recording elements 4 according to the output signals from the comparators 42, 44 and 46 for a total of 65,536 pulses per frame.

The recirculation of each group of 512 digital words 128 times through the loop including the recirculate register 32 and the holding registers 34, 36 and 38 enables each of the digital words to be monitored by the digital comparators 42, 44 and 46. Since the range of digital words produced by the A/D converter 10 encompasses only the longitudinal height of a transverse recording frame, the recording medium position detector 40 is arranged to produce a synchronized series of position signals within the same range of digital words. Concurrently, the multiplexers 48 and 54 are driven by the clock means to sequence the possible "set" and "reset" signals to successive ones of the flip-flops 50 and, accordingly, to succesive ones of the recording elements 4. In other words, the position of a digital word in the group of 512 words in the circulation loop represents its position across the recording frame, i.e., time axis of the recorded waveshape, while the digital value of the circulated words represents its position along the recording frame, i.e., the amplitude axis of the recorded waveshape. Thus, for each transverse recording line, all of the 512 digital words are compared to determine if a waveshape recording is to be made along that recording line while the concurrent stepping of the multiplexers 48 and 54 directs a recording element energizing signal to appropriate ones of the recording elements 4, i.e., more than one recording element can be energized along each recording line. The turning "on," or energizing, of the recording elements is produced by a B=D signal applied by the first multiplexer 48 to a "set" input of ones of the flip-flops 50. These energized recording elements are left "on" until the recirculation of the group of 512 digital words either on the next recording line or a subsequent recording line produces an "off" output signal from the AND gate 52 and the second multiplexer 54 has been stepped to apply this "off" signal to the reset input of the previously set flip-flops. This output signal from the AND gate 52 represents a comparison of immediately adjacent digital words with a recording medium position word with a result that both are smaller in value than the recording medium position word.

For example, a digital word having value of five could have turned "on" one or more of the recording elements 4 on the fifth recording line. On the sixth recording line, a continuing recording mark by the same recording elements would be effected by a digital word value of six occurring at the time that the B=D line is connected by the multiplexer 48 to the flip-flops energizing the aforesaid recording elements. Such a succession of events would draw one or more longitudinal lines on the recording medium 1, e.g., a recording of the sides of a square-wave waveshape. On the other hand, if it is desired to terminate a recording mark on the next recording line, a digital word having a value of six would not be present as described above and the prior digital word A would be present i.e., a value of five, along with a next digital word C having a digital value, e.g., seven, greater than the present digital value of six for the D signal to indicate that the adjacent recording element will be recording on the seventh line. Since a recording element will continue to record during the movement from one recording line to another until it is turned "off," the recorded marks will be interconnected, i.e., overlap, to emphasize the accuracy and aesthetic qualitites of the recording. Similarly, recording marks from adjacent recording elements when sequentially energized will, also, produce overlapping marks which will appear to an observer to form a continuous recording line.

In FIG. 1, there is shown, a recording medium 1 having several transverse frames of recorded information illustrated thereon. The space between the transverse frame of recorded information is provided by moving the recording medium 1 a predetermined number or recording lines without recording and the time used for this operation is used to transfer the digital word information from the storage register 14 to the recirculate register 32 with a burst of 512 clock pulses as described above. Further, a portion of one of the transversely recorded waveshape has been partially enlarged to show the actual recording marks and their overlapping relationship.

Figure 3:
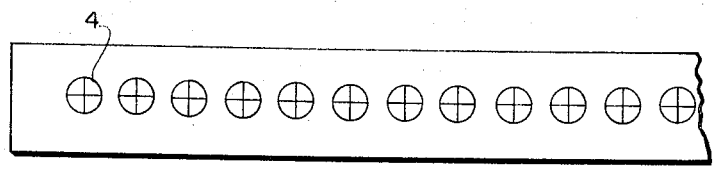
FIG. 3 is a pictorial illustration of an arrangement of recording elements for actuation by the rcording system shown in FIG. 2.
Figure 4:
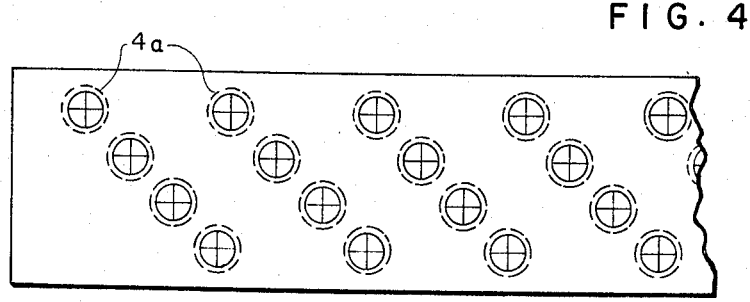
FIG. 4 is another arrangement of recording elements.

In FIG. 3, there is shown a top view of the recording elements 4 arranged along a recording line. On the other hand, in FIG. 4 there is shown a top view of another arrangement of recording elements 4A which are unable to be arranged along a recording line as shown in FIG. 3 owing to space requirements, e.g., the diameter of the solenoid coils wrapped on each of the recording elements 4a exceeds the desired linear spacing of the elements 4A. In order to increase the space available for each of the recording elements 4A, the recording elements 4A can be arranged in four groups with each group having 128 of the recording elements 4A and the combination of the four groups forming the 512 recording elements for recording on a recording line across the recording medium 1. Thus, the arrangement of the recording elements 4A shown in FIG. 4 is composed of four transverse lines of recording elements across the recording medium 1 with the distance between adjacent recording elements 4A on any one of the four transverse lines is sufficient to allow recording marks by three of the recording elements 4A to pass therebetween. In other words, the recording elements 4A are arranged in groups of four along parallel skewed lines with the bottom of one of the recording elements 4A of a group as viewed in FIG. 1 preceding the top one of the next group of the four recording elements 4A.

Figure 5:
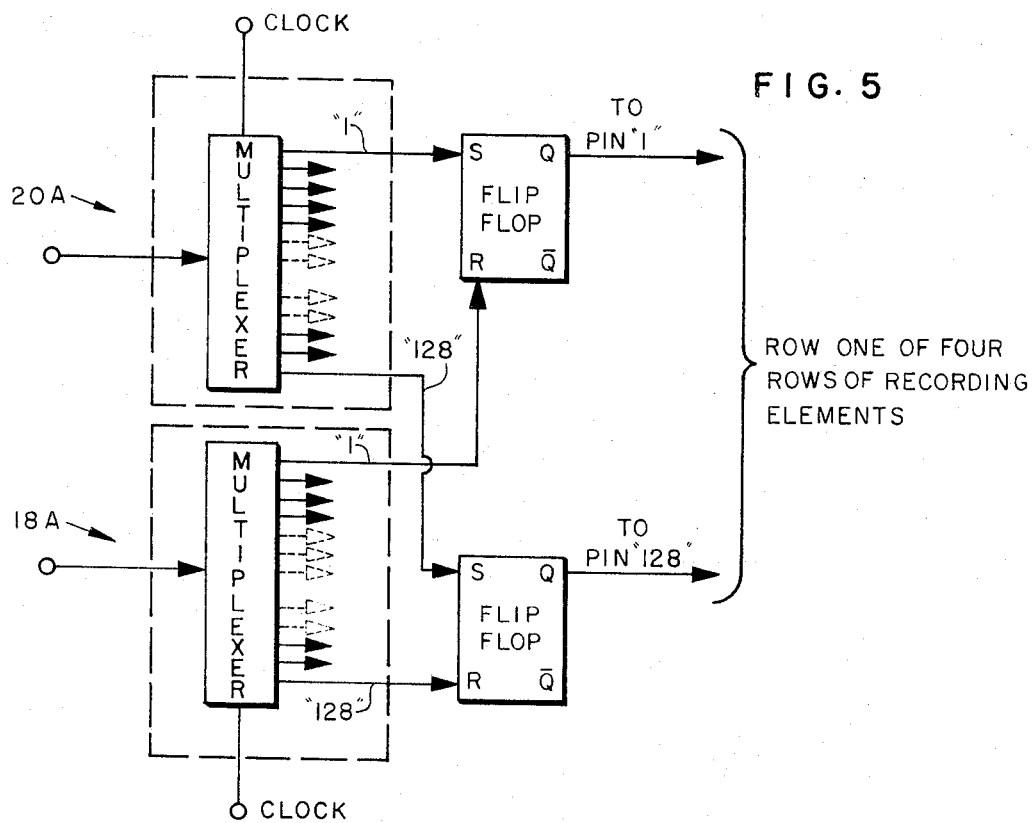
FIG. 5 is a portion of a block diagram of another embodiment of the present invention suitable for energizing the recording elements shown in FIG. 4.

In order to provide a recording system utilizing such an arrangement of the recording elements 4A, a modification of the logic system shown in FIG. 2 may be used wherein all of the elements except for the A/D converter 10 and the medium position means 40 would be duplicated four times. Concurrently, a multiplexer would be arranged at the output of the A/D converter 10 to sequence each of the input digital words to an appropriate one of the storage registers 14, e.g., a first digital word would be fed to a first storage register, a second digital word would be fed to a second storage register, a third digital word would be fed to a third storage register, a fourth digital word would be fed to a fourth storage register, a fifth digital word would be fed to a first storage register, etc. The output multiplexers from each of the four duplicated circuits corresponding to multiplexers 18 and 20 would be arranged to handle only one transverse line of the recording elements 4A, i.e., 128 recording elements 4A. A portion of the multiplexer logic circuit for driving one line of the recording elements 4A is shown in FIG. 5. The use of the four-element groups of the recording elements 4A as shown in FIG. 4 would reduce the signal handling requirements of the register 32 and the comparators 42, 44 and 46, i.e., the signal speed requirements would be reduced by a factor of four since each electronic circuit group would be handling only 128 digital words.

Accordingly, it may be seen that there has been provided a digital recording apparatus for recording on a recording medium tranversely to the direction of motion of the recording medium using interconnected incremental marks.

The embodiments of the invention in which an exclusive property or privilege is claimed are defined as follows:

1. A recorder comprising an analog-to-digital converter having an input circuit and an output circuit, input signal means arranged to connect said input circuit of said converter to a source of analog signals to be converted, register means for storing digital words defining a recording line, circuit means connecting said output circuit of said converter means to said register means, means for transporting a recording medium past a recording station, means for detecting the movement of said recording medium to produce a digital word representing the detection of a recording line position on said recording medium, means for comparing each of the digital words defining a recording line stored in said register means with said digital word representing a recording line position on said recording medium, a plurality of recording elements located at said recording station and equal in number to the number of digital words stored in said register means to define a recording line and means for energizing a recording element in said plurality of recording elements upon the detection of an equality by said means for comparing between a digital word in said digital words defining a recording line and said digital word representing a recording line position on said recording medium.

2. A recorder as set forth in claim 1 wherein said recorder line is transverse to the direction of motion of a recording medium and a plurality of said recording lines defines a recording frame with each frame forming a transverse recording.

3. A recorder as set forth in claim 1 and including means for supplying a plurality of digital words with each of the last-mentioned digital words representing a recording line to said means for comparing.

4. A recorder as set forth in claim 1 wherein said means for energizing includes means to maintain an energized state of a selected one of said recording elements until a deenergized state of said selected one of said recording elements is ordered by said means for comparing.

5. A recorder as set forth in claim 4 wherein said means to maintain includes an energizing signal storage means for each of said recording elements.

6. A recorder as set forth in claim 5 wherein said means for energizing includes an energizing signal multiplexing means for sequentially routing energizing signals to preselected ones of said storage means.

7. A recorder as set forth in claim 6 wherein said means for energizing includes a deenergizing signal multiplexing means for sequentially routing deenergizing signals to preselected ones of said storage means to erase a previously stored energizing signal.

8. A recorder as set forth in claim 7 and including clock means for synchronously operating said energizing signal multiplexing means and said deenergizing signal multiplexing means.

9. A recorder as set forth in claim 8 wherein said means for comparing includes three digital comparators, a first one of said comparators being arranged to compare said digital word representing a recording line position with a first one of said digital words defining a recording line, a second one of said comparators being arranged to compare said digital word representing a recording line position with a second one of said digital words defining a recording line, said second one of said digital words being next to said first one of said digital words as stored in said register means and a third one of said digital words being arranged to compare said digital word representing a recording line position with a third one of said digital words defining a recording line, said third one of said digital words being next to said second one of said digital words as stored in said register, said first and third comparators being arranged to produce a deenergizined signal for said recording elements upon a detected equality of the compared words and said second comparator being arranged to produce an energizing signal for said recording elements upon a detected equality of the digital words compared thereby.

10. A recorder as set forth in claim 9 wherein said clock means is arranged to operate said three comparators synchronously with said energizing and deenergizing signal multiplexer means.

* * * * *